United States Patent [19]
Beard et al.

[11] Patent Number: 5,666,057
[45] Date of Patent: Sep. 9, 1997

[54] METHOD OF SKIN EFFECT CORRECTION AND DATA QUALITY VERIFICATION FOR A MULTI-FREQUENCY INDUCTION WELL LOGGING INSTRUMENT

[75] Inventors: David R. Beard, Houston; Qiang Zhou, Missouri City, both of Tex.

[73] Assignee: Western Atlas International, Inc., Houston, Tex.

[21] Appl. No.: 608,731

[22] Filed: Feb. 29, 1996

[51] Int. Cl.⁶ .............................. G01V 3/18; G01V 3/10
[52] U.S. Cl. ........................................ 324/339; 364/422
[58] Field of Search ............................ 324/323, 338, 324/339, 340, 341, 342, 343, 232, 225; 364/422

[56] References Cited

PUBLICATIONS

Kaufman, "Reslolving Capabilities of Inductive Electroprospecting", Geophysics vol. 43, No. 7 pp. 1392–1398, Dec. 1978.

Moran et al. "Basic Theory of Induction Logging and Application to Study of Two Coil Sondes", Geophysics, vol. 27 No. 6, Dec. 1962.

*Primary Examiner*—Walter E. Snow
*Attorney, Agent, or Firm*—Richard A. Fagin

[57] ABSTRACT

A method of correcting receiver signals in an induction well logging instrument for skin effect. The method includes determining a magnitude of signals induced in an induction receiver at each one of a plurality of different frequencies, determining a relationship of the magnitudes with respect to frequency, and determining a skin effect corrected conductivity by determining a value of the relationship which would obtain when the frequency is equal to zero. In a preferred embodiment, the step of determining the relationship includes calculating a best fit curve of the magnitudes with respect to the frequency, calculating the first derivative of the best fit curve with respect to the frequency, and calculating a correction for the signals at a selected frequency according to the relationship of the first derivative with respect to the frequency. The correction is applied to the signal at the selected frequency to calculate a skin effect corrected signal.

In a specific embodiment, the step of curve fitting includes generating a weighting factor for each frequency based on the noise variance of each frequency. The specific embodiment includes constraining the best fit curve so that the first derivative of the best fit curve is generally less than zero and the second derivative of the best fit curve is generally more than zero.

13 Claims, 4 Drawing Sheets

METHOD OF SKIN EFFECT CORRECTION AND DATA QUALITY VERIFICATION FOR A MULTI-FREQUENCY INDUCTION WELL LOGGING INSTRUMENT

BACKGROUND OF THE INVENTION

1. Field of the Invention

The present invention is related to the field of electromagnetic induction well logging instruments. More specifically, the present invention is related to methods of correcting the response of receivers in electromagnetic induction well logging instruments for the so-called "skin effect", and to verify the integrity of signals acquired by the receivers in an induction logging instrument.

2. Description of the Related Art

Electromagnetic induction well logging instruments are used to make measurements of the electrical resistivity of earth formations penetrated by wellbores. Induction well logging instruments typically include a sonde having a transmitter coil and one or more receiver coils at axially spaced apart locations from the transmitter coil. Induction well logging instruments typically include a source of alternating current (AC) which is conducted through the transmitter coil. The AC passing through the transmitter coil induces alternating eddy currents in the earth formations. In general, the magnitude of the eddy currents is proportional to the electrical conductivity (the inverse of the electrical resistivity) of the earth formations surrounding the instrument. The eddy currents in turn induce voltages in the receiver coils. The magnitude of the voltages induced in the receiver coils is generally proportional to the magnitude of the eddy currents. The conductivity of the earth formations therefore can be related to the magnitude of the voltages induced in the receivers.

The relationship of the magnitude of the eddy currents with respect to the conductivity of the earth formations is affected both by the frequency of the AC in the transmitter coil and by the conductivity of the earth formations themselves. The voltage actually induced in the receiver coils is typically less than what would be induced for any value of conductivity were the relationship between eddy current magnitude and the induced voltage a linear one. The difference between the voltage actually induced and the voltage which would have been induced were the relationship a linear one results from the so-called "skin effect".

Various methods of determining the magnitude of the voltages which would have been induced in the receiver coil absent the skin effect (thereby being able to determine the conductivity of the earth formations) are known in the art. A relationship, between the voltage induced in the receiver coils which is in-phase with the AC flowing through the transmitter coil with respect to the formation conductivity, is described in a paper by J. H. Moran and K. S. Kunz entitled "Basic Theory of Induction Logging and Application to Study of Two-Coil Sondes", Geophysics, vol. XXVII, no. 6, Part I (December), Society of Exploration Geophysicists (1962). The relationship described in the Moran and Kunz reference is typically limited to use in formation conductivities less than about 2 S/m at an AC frequency of about 20 KHz. At higher values of conductivity the magnitude of the in-phase voltage induced in the receiver is non-uniquely related to the conductivity, making it difficult to determine conductivity.

An improvement over the Moran and Kunz method is described, for example, in U.S. Pat. No. 3,147,429 issued to Moran. The Moran '429 patent describes a method of combining receiver signal components which are in-phase and 90 degrees out of phase (in quadrature) with the AC flowing through the transmitter, at a single frequency, in order to better estimate the skin effect magnitude. The method in the Moran '429 patent has proven to be difficult to use, particularly because it is difficult to measure accurately the magnitude of the receiver signal components in quadrature with the transmitter current. Further, the quadrature voltage magnitude is not only related to the conductivity, but is also affected by the magnetic and dielectric properties of the earth formations surrounding the tool, making determination of the conductivity by this method much more difficult.

U.S. Pat. No. 4,471,436 issued to Barber et al describes an implementation of the method described in the Moran '429 patent, but the implementation disclosed in the Barber et al '436 patent is still limited as to the effects of magnetic materials in the wellbore and the accuracy with which the quadrature signal can be measured.

An induction well logging instrument described in U.S. Pat. No. 5,175,605 issued to Chandler et al includes measurement of induction signals at two different frequencies. The apparatus in the Chandler et al '605 patent, however, does not provide for determining the frequency dependence of the skin effect, and so is limited as is the method of Moran '429 and Barber et al '436.

Another method of determining skin effect corrected conductivity is described in U.S. Pat. No. 4,611,173 issued to Bravanec et al, which includes adjustment of the frequency of the AC passing through the transmitter in response to the apparent conductivity of the earth formations. In higher conductivity formations, the magnitude of the skin effect can typically be reduced by operating the transmitter at a lower frequency. Lower operating frequency however, typically reduces the conductivity resolution of the instrument because for any particular value of formation conductivity, the magnitude of the voltage induced in the receiver absent skin effect is proportional to the AC frequency. It has also proven difficult in practice to adjust the operating frequency of the alternating current while the instrument is operating in a wellbore. This has made the system in the Bravanec et al '173 patent commercially impracticable.

A method is known in the art for estimating the frequency dependence of the skin effect by measuring skin effect at two frequencies and obtaining the difference between the skin effect at the two frequencies and extrapolating the difference to zero frequency. This method is described in A. A. Kaufman, "Resolving Capabilities of the Inductive Methods of Electroprospecting", Geophysics, vol. 43, no. 7, pp 1392–1398, Society of Exploration Geophysicists (1978). A drawback to the method in the Kaufman reference is that the differences in the skin effect at the two different frequencies is typically very small (except at high frequencies and high conductivities), which can result in large extrapolation errors. Another drawback to this method is that the apparent conductivity (receiver) signals can be noisy. Extrapolation to zero frequency of apparent conductivity values at only two frequencies is typically inadequate in the presence of significant amounts of noise to accurately represent the relationship of skin effect with respect to frequency.

Accordingly, it is an object of the present invention to provide a method of determining the skin effect magnitude which includes using response from a plurality of frequencies to better determine the frequency dependence of the skin effect, and thereby provide a more accurate determination of the true conductivity of the earth formation.

It is a further object of the present invention to provide a method for reducing noise and increasing accuracy in induction logging instrument signals by determining receiver response at a plurality of different frequencies and at a plurality of receivers so as to identify and adjust for noise originating in any of the receivers at any value of frequency.

SUMMARY OF THE INVENTION

The present invention is a method of correcting receiver signals in an induction well logging instrument for the skin effect. The method includes the steps of determining a magnitude of the receiver signals induced in the receiver at each one of a plurality of different frequencies. A relationship of the magnitude with respect to the frequency is determined. A skin effect corrected conductivity is determined by determining the value of the relationship which would obtain when the frequency is equal to zero. In a preferred embodiment of the invention, the step of determining the relationship includes determining a best fit curve of the magnitudes with respect to the frequency. The first derivative of the best fit curve with respect to the frequency is calculated, and a correction for the signals is calculated at a selected frequency, according to the relationship of the first derivative with respect to the frequency. The correction is applied to the signal magnitude at that frequency to calculate a skin effect corrected signal.

In a specific embodiment of the invention, the step of curve fitting includes generating a weighting factor for each frequency. The weighting factor is based on the noise variance of the response at each frequency. The specific embodiment of the invention also includes constraining the best fit curve so that the first derivative of the best fit curve is generally less than zero and the second derivative of the best fit curve is generally more than zero.

DESCRIPTION OF THE PREFERRED EMBODIMENT

Figure 1:
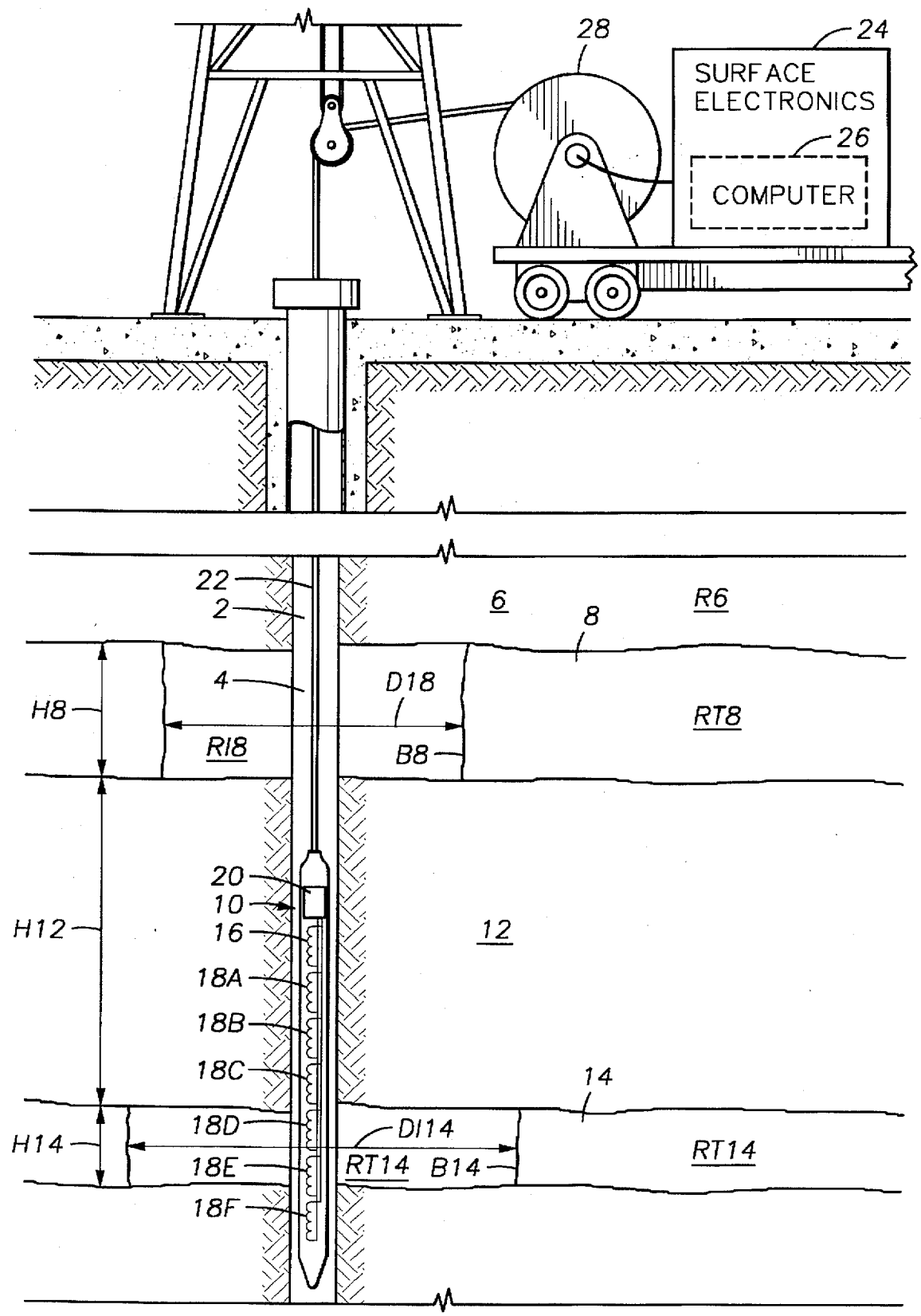
FIG. 1 shows an electromagnetic induction well logging apparatus as it is typically used in a wellbore.

FIG. 1 shows an induction well logging instrument 10 disposed in a wellbore 2 penetrating earth formations. The earth formations are shown generally at 6, 8, 12 and 14. The instrument 10 is typically lowered into the wellbore 2 at one end of an armored electrical cable 22, by means of a winch 28 or similar device known in the art. An induction well logging instrument which will generate appropriate types of signals for performing the process of the present invention is described, for example, in U.S. Pat. No. 5,452,761 issued to Beard et al. The instrument described in the Beard et al '761 patent is meant only to serve as an example of, and is not meant to be an exclusive representation of induction well logging instruments which can generate signals usable for performing the process of the present invention. The instrument in the Beard et al '761 patent is therefore not to be construed as a limitation on the present invention. The instrument described in Beard et al '761 patent, however, has certain advantages for use in performing the method of the present invention which will be further explained.

The instrument 10 can include a telemetry/signal processing unit 20 (SPU). The SPU 20 can include a source of alternating current (not shown separately). The alternating current is generally conducted through a transmitter coil 16 disposed on the instrument 10. Receiver coils 18A–18F can be disposed at axially spaced apart locations along the instrument 10. The SPU 20 can include receiver circuits (not shown separately) connected to the receiver coils 18A–18F for detecting voltages induced in each of the receiver coils 18A–18F. The SPU 20 can also impart signals to the cable 22 corresponding to the magnitude of the voltages induced in each of the receiver coils 18A–18F. It is to be understood that the number of transmitter and receiver coils, and the relative geometry of the transmitter and receiver coils shown in the instrument in FIG. 1 is not meant to be a limitation on the present invention. It is to be further understood that the receiver coils shown in FIG. 1 can either be single coils or a type of receiver coil known in the art as "mutually balanced" wherein each receiver coil includes a primary coil (not shown separately) and a second coil (not shown separately) wound in series connection and in inverse polarity to the primary coil (not shown separately) so as to reduce the effect of direct induction from the transmitter coil 16.

As is understood by those skilled in the art, the alternating current passing through the transmitter coil 16 induces eddy currents in the earth formations 6, 8, 12, 14. The eddy currents correspond in magnitude both to the electrical conductivity of the earth formations 6, 8, 12, 14 and to the relative position of the particular earth formation with respect to the transmitter coil 16. The eddy currents in turn induce voltages in the receiver coils 18A–18F, the magnitude of which depends on both the eddy current magnitude and the relative position of the earth formation with respect to the individual receiver coil 18A–18F.

The voltages induced in each receiver coil 18A–18F correspond to apparent electrical conductivity of all of the media surrounding the instrument 10. The media include the earth formations 6, 8, 12 and 14 and the drilling mud 4 in the wellbore 2. The degree of correspondence between the voltages induced in a particular receiver coil, and the electrical conductivity of the particular earth formation axially disposed between the particular receiver coil and the transmitter coil 16, can depend on the vertical thickness of the particular earth formation, such as shown at H8 for earth formation 8. A more closely spaced receiver coil such as 18A would have more of its voltage induced by eddy currents flowing from entirely within a thinner formation such as 14 (having a thickness shown at H14), than would be the case for a longer spaced receiver coil such as 18F. Conversely, the eddy currents which induce the voltages in receiver coil 18A would more likely correspond to the conductivity within a zone such as shown at RI14, which is affected by fluid "invasion" into its pore spaces from the liquid phase of a fluid 4 used to drill the wellbore (commonly known as "drilling mud", the liquid phase known as "mud filtrate"). The radial distance from the center of the wellbore 2 to which the mud filtrate penetrates the particular earth formation can be different for each formation. A more deeply invaded zone DI14 in formation 14 is shown in comparison to a more shallow invaded zone DI8 in formation 8. Other formations, such as 6 and 12, may be substantially impermeable to fluid flow and therefore may not have invaded zones at all. The radial depth of invasion, such as DI8 or DI14, is typically not known at the time the instrument 10 is moved through the wellbore 2.

The drilling mud 4 itself can be electrically conductive. Eddy currents can flow in such conductive drilling mud, and therefore the voltages induced in each of the receiver coils 18A–18F can also partially depend on the conductivity of the mud 4 and the diameter of the wellbore, shown at D. As is understood by those skilled in the art, the wellbore diameter D is subject to variation as a result of "caving" or "washout". Devices (calipers) for measuring the wellbore diameter D are well known in the art, but are typically impractical to use in the process of correcting the receiver coil signals for the effects of eddy current flow in the wellbore 2.

The signals corresponding to the voltages in each receiver coil 18A–18F can be transmitted along the cable 22 to surface electronics 24. The surface electronics 24 can include detectors (not shown) for interpreting the signals from the instrument 10 and a computer 26 to perform the process according to the present invention on the signals transmitted thereto. It is to be understood that the SPU 20 could also be programmed to perform the process of the present invention. Processing the receiver coil signals in the computer 26 is a matter of convenience for the system designer and is not to be construed as a limitation on the present invention.

The correspondence between the magnitude of the voltages induced in each receiver coil 18A–18F and the conductivity of the media surrounding the instrument 10 is affected by a phenomenon referred to as the "skin effect". In the present embodiment of the invention, the voltage signals induced in each receiver coil 18A–18F can be used to determine the magnitude of the skin effect, so that a more precise value of the conductivity of the media surrounding the instrument 10 can be determined.

A particular advantage of using an apparatus like the one disclosed in the Beard et al '761 patent as it relates to the present invention, is that the transmitter coil described in the apparatus of the Beard et al '761 patent can be energized with alternating current having a plurality of different component frequencies, and the SPU as disclosed in Beard et al '761 is adapted to generate signals which can be interpreted as to the magnitude of the induced voltages at each one of the plurality of different component frequencies.

The present invention includes using the actual response of the receiver coils 18A–18F at each component frequency to determine the response of the receiver coils 18A–18F which would obtain at an alternating current frequency equal to zero. In the present embodiment of the invention, the component frequencies can include 10, 30, 50, 70, 90, 110, 130 and 150 kilohertz (KHz), which as explained in the Beard et al '761 patent can be generated by energizing the transmitter coil with 10 KHz square wave current. It is to be understood that the number of component frequencies and the values of each component frequency selected for use in the present invention are a matter of convenience for the system designer and are not to be construed as a limitation on the present invention. The present invention can perform as described herein using a smaller number of frequencies, or using different frequencies. Using eight frequencies as disclosed herein provides a high degree of accuracy in determining the response of the receiver coils 18A–18F which would obtain at zero frequency. Typically the method of the present invention will have improved accuracy when the number of component frequencies is increased, but the number of component frequencies used may be limited, as a practical matter, by the capability of the instrument 10 to generate and receive such frequencies.

The method of the present invention can be better understood by an explanation derived from the theory of operation of induction well logging instruments. For simplicity of the following explanation, the induction well logging instrument (shown as 10 in FIG. 1) can be reduced to a theoretical one having a single transmitter coil (such as 16 in FIG. 1), and one of the previously described "mutually balanced" receiver coils (such as 18C in FIG. 1) located at an axial spacing from the transmitter coil represented by L. A second variable α represents the ratio of axial spacings from the transmitter to the "bucking" receiver coil (TR$_2$), with respect to the axial spacing from the transmitter to the main receiver coil (TR$_1$), so that α=(TR$_2$/TR$_1$). If the theoretical instrument were to be disposed in a homogeneous medium, having electrical conductivity represented by σ and magnetic permeability represented by μ, the voltage induced in the receiver coil (which corresponds to "apparent conductivity" σ$_a$) at any particular angular frequency of the alternating current, ω, can be determined by the following expression:

$$\sigma_a = \sigma \frac{2}{(kL)^2} \frac{1}{(1-\alpha^2)} [(1-ikL)e^{ikL} - (1-ikL\alpha)e^{ikL\alpha}] \quad (1)$$

wherein i represents the square root of −1, k=(1+i)/δ, and δ=(2/ωμσ)$^{1/2}$.

By separating the real and imaginary parts of equation (1), the expression for the real part of the apparent conductivity can be shown as:

$$\Re \frac{\sigma_a}{\sigma} = \frac{1}{1-\alpha^2} \frac{1}{x^2} (e^{-x}[-x\cos x + (1+x)\sin x] - \quad (2)$$

$$e^{-\alpha x}[-\alpha x \cos(\alpha x) + (1+\alpha x)\sin(\alpha x)])$$

and the imaginary part of the apparent conductivity can be shown as:

$$\Im \frac{\sigma_a}{\sigma} = \frac{1}{1-\alpha^2} \frac{1}{x^2} (e^{-x}[(1+x)\cos x + x\sin x] + \quad (3)$$

$$e^{-\alpha x}[(1+\alpha x)\cos(\alpha x) + (\alpha x)\sin(\alpha x)])$$

where in equations (2) and (3) x=L/δ.

The expressions for the real and imaginary parts of the apparent conductivity can be expressed as Taylor series expansions as shown here for the real part:

$$\Re\left(\frac{\sigma_a}{\sigma}\right) = 1 - \frac{2}{3} \frac{1-\alpha^3}{1-\alpha^2} x + \frac{2}{15} \frac{1-\alpha^5}{1-\alpha^2} x^3 - \quad (4)$$

$$\frac{1}{18} \frac{1-\alpha^6}{1-\alpha^2} x^4 + \ldots$$

and for the imaginary part:

$$\Im\left(\frac{\sigma_a}{\sigma}\right) = \frac{2}{3} \frac{1-\alpha^3}{1-\alpha^2} x - \frac{1}{2} \frac{1-\alpha^4}{1-\alpha^2} x^2 + \quad (5)$$

$$\frac{2}{15} \frac{1-\alpha^5}{1-\alpha^2} x^3 - \frac{1}{105} \frac{1-\alpha^7}{1-\alpha^2} x^5 + \ldots$$

In the present invention, a skin effect corrected value for the conductivity of the media surrounding the instrument can be obtained by using the first and second derivatives of a relationship between the apparent conductivity and the frequency of the alternating current. It has been determined that the skin effect corrected conductivity can be determined by using only the real component of the apparent conductivity. Where the formation conductivity is relatively low, the skin effect corrected conductivity can be expressed in terms of the real component of the apparent conductivity (expressed hereinafter as $\sigma_r$) by the expression:

$$\sigma_{c1} = \sigma_a - 2f \frac{d\sigma_a}{df} \qquad (6)$$

A Taylor series expansion for the skin effect corrected conductivity according to equation (6) can be shown as:

$$\frac{\sigma_{c1}}{\sigma} = 1 - \frac{4}{15} \frac{1-\alpha^5}{1-\alpha^2} x^3 + \ldots \qquad (7)$$

In very conductive earth formations (typically conductivities on the order of several S/m or more) it may be necessary to use the second derivative as well as the first derivative of the relationship between apparent conductivity and frequency to calculate skin effect corrected conductivity since the relationship between apparent and true conductivities becomes even less linear than at lower conductivities. An expression including the second derivative of the apparent conductivity with respect to frequency used to calculate the skin effect corrected conductivity can be shown as:

$$\sigma_{c2} = \sigma_a - \frac{4}{3} f \left( \frac{d\sigma_a}{df} \right) + \frac{4}{3} f^2 \left( \frac{d^2\sigma_a}{df^2} \right) \qquad (8)$$

The expression in equation (8) can be shown as a Taylor series expansion as:

$$\frac{\sigma_{c2}}{\sigma} = 1 - \frac{1}{18} \frac{1-\alpha^6}{1-\alpha^2} x^4 + \ldots \qquad (9)$$

As previously explained, a skin effect corrected conductivity can be determined by using the expressions in equations (6) or (8). Any value of frequency desired by the system operator which is within the range of frequencies for which signals are detected at the receiver can be used in the relationships of equations (6) and (8). It is preferable however, to use frequencies generally in the middle of the frequency range over which signals are detected to avoid calculation inaccuracy which may occur close to the ends of the frequency range.

The method by which the present invention can determine the first and second derivatives of the relationship of apparent conductivity with respect to frequency will now be explained. The apparent conductivity response of the receiver, $\sigma_\alpha$, for each individual component frequency of the alternating current passing through the transmitter, can serve to define the relationship of apparent conductivity with respect to frequency. A useful means of characterizing the relationship can be to generate a continuous curve of the apparent conductivity values with respect to frequency which "best fits" the apparent conductivity values. The best fit curve can be calculated by methods known in the art for fitting continuous curves to a set of discrete data points. In the present invention, the best fit curve is more conveniently represented as a polynomial function with respect to frequency. It is to be understood that other ordered relationships besides polynomial functions can serve as best fit curves. Polynomial functions have the advantage of easily computed first and second derivatives, as will be further explained.

In the present invention, as previously explained, the alternating current can include a 10 KHz square wave having component frequencies of 10, 30, 50, 70, 90, 110, 130 and 150 KHz. The apparent conductivity relationship can be expressed as:

$$\sigma_\alpha = y_0 + y_1 f + y_2 f^2 + \ldots + y_{n-1} f^{n-1} \qquad (10)$$

$y_0$ through $y_{n-1}$ in equation (10) represent the coefficients of the polynomial expression which are to be solved, and n represents the number of unknowns (typically less than or equal to the number of frequencies, m, which in the present embodiment can be eight). A system of equations can be designed to solve the polynomial coefficients:

$$AY = \sigma_\alpha \qquad (11)$$

A can be represented by the following expression:

$$A = \begin{bmatrix} 1 & f_1 & f_1^2 & \ldots & f_1^{n-1} \\ 1 & f_2 & f_2^2 & \ldots & f_2^{n-1} \\ & & \cdot & & \\ & & \cdot & & \\ & & \cdot & & \\ 1 & f_m & f_m^2 & \ldots & f_m^{n-1} \end{bmatrix} \qquad (12)$$

where the coefficients to be solved are expressed in vector Y:

$$Y = (y_0, y_1, y_2, \ldots y_{n-1})^T \qquad (13)$$

and the apparent conductivity values at each component frequency are expressed in vector $\sigma_\alpha$:

$$\sigma_\alpha = (\sigma_1, \sigma_2, \sigma_3, \ldots \sigma_m)^T \qquad (14)$$

Apparent conductivity measurements made at each component frequency are subject to various amounts of noise. Noise can be generally observed by deviation of an apparent conductivity measurement from the value of the polynomial function at the particular component frequency at which the apparent conductivity measurement is made. The noise variance, $v^2_j$, of the apparent conductivity measurement at each component frequency can be used to generate a weighting factor matrix:

$$W = \begin{bmatrix} \frac{1}{v_1^2} & & & & \\ & \frac{1}{v_2^2} & & & \\ & & \cdot & & \\ & & & \cdot & \\ & & & & \frac{1}{v_m^2} \end{bmatrix} \qquad (15)$$

The weighting factor matrix in equation (15) can be combined with the expression in equation (12) to provide a solution for the polynomial coefficients which can be generated by minimizing an object function as shown in the following expression:

$$O = (\sigma_\alpha - AY)^T W (\sigma_\alpha - AY) \qquad (16)$$

The quality of performance of the expression in equation (16) can be substantially improved, particularly in the presence of noise in some of the apparent conductivity measurements, by constraining the first and second derivatives to values which are most likely to occur in earth formations. For most values of conductivity of the earth formations, the first derivative is typically less than zero and the second derivative is typically greater than zero. In very high conductivity earth formations, the first derivative of the apparent conductivity at the higher frequencies can become positive. In higher conductivity formations, typically those having conductivity above about 10 S/m, it is preferable to constrain the first derivative to less than zero only for the lower frequencies (for example 10 and 30 KHz). The first and second derivatives can be calculated from the polynomial expression determined for the apparent conductivity by using the polynomial coefficients according to the following expression for the first derivative:

$$\frac{d\sigma_a}{df} = y_1 + 2y_2 f + \ldots + (n-1)y_{n-1}f^{n-2} \tag{17}$$

and the following expression for the second derivative:

$$\frac{d^2\sigma_a}{df^2} = 2y_2 + \ldots + (n-1)(n-2)y_{n-1}f^{n-3} \tag{18}$$

Figure 2A:
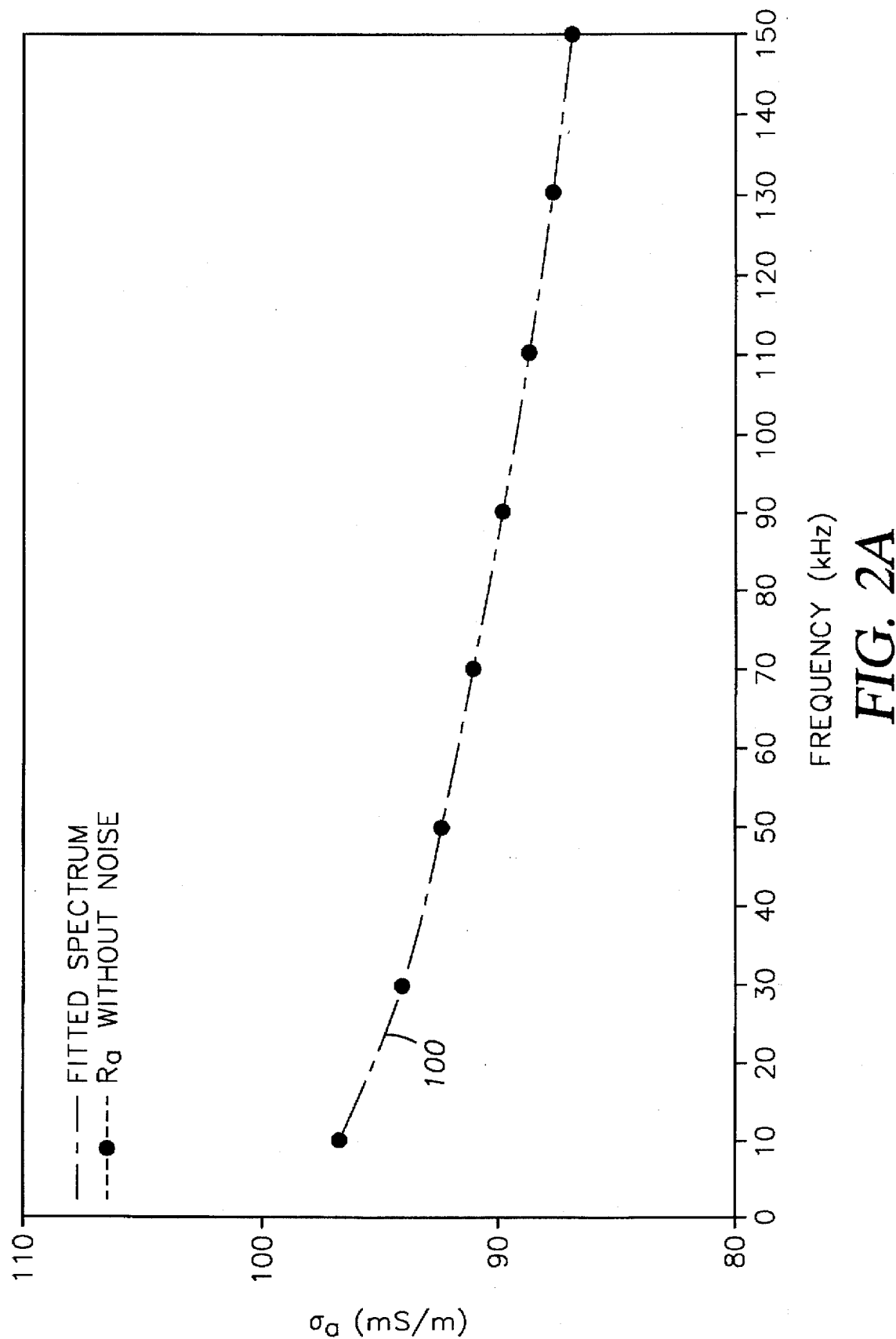
FIG. 2a shows a best fit curve calculated according to the present invention for receiver signals substantially free of noise.
Figure 2B:
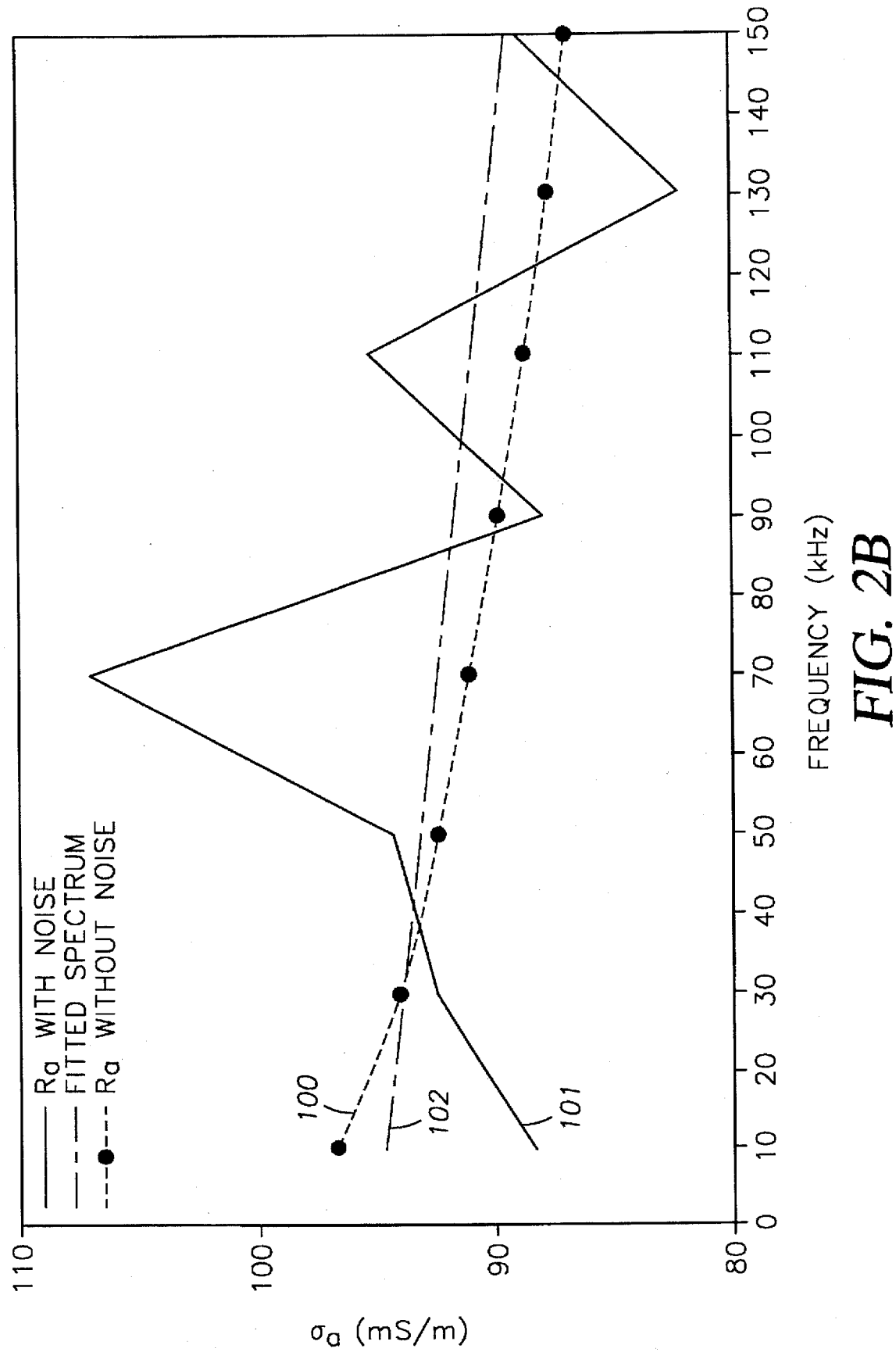
FIG. 2b shows a best fit curve calculated according to the present invention for noisy receiver signals. The first and second derivatives of the best fit curve are constrained according to the present invention.
Figure 2C:
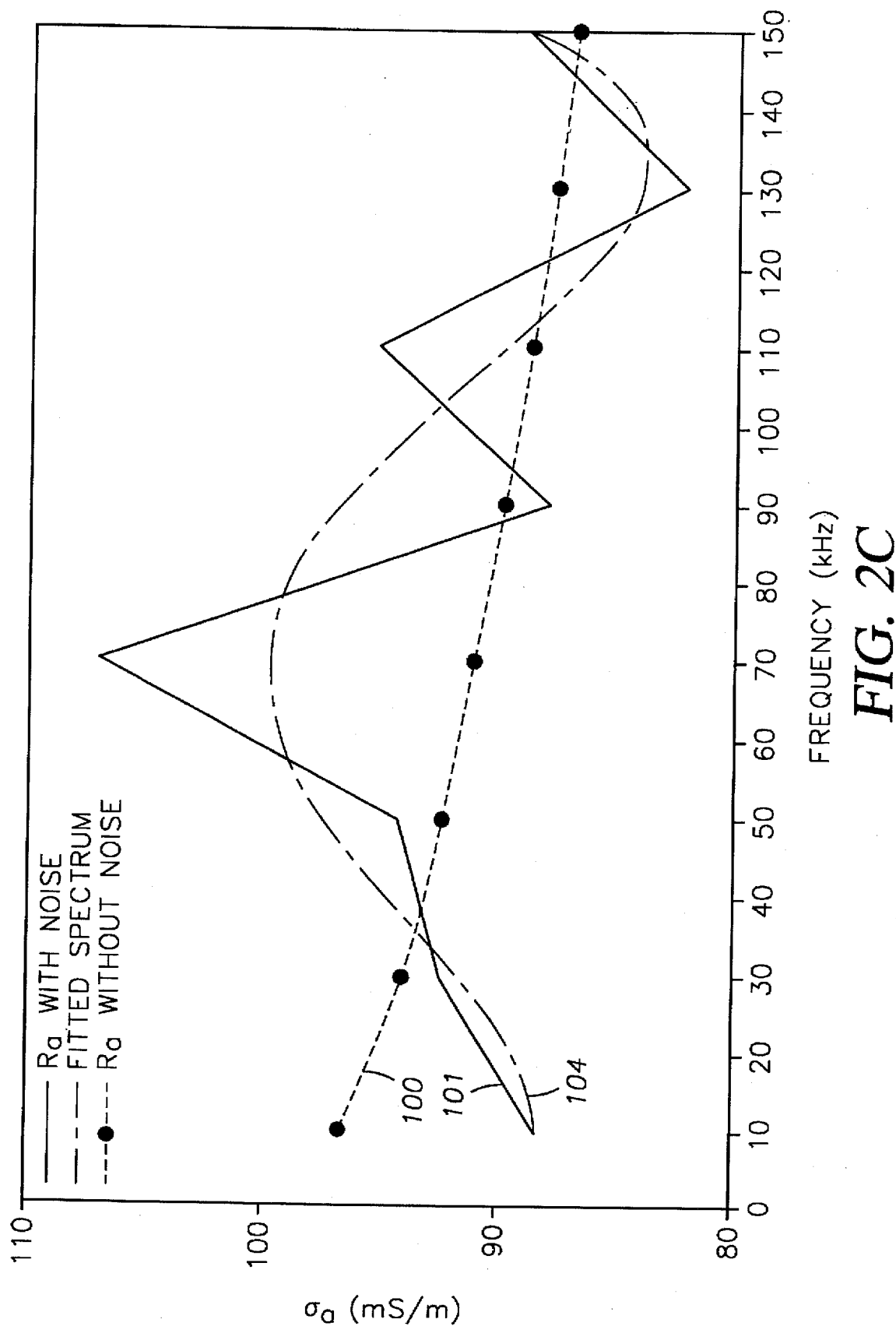
FIG. 2c shows a best fit curve calculated according to the present invention for the same noisy receiver signals as in FIG. 2b, but the first and second derivatives of the best fit curve were not constrained.

The improvement in performance provided by constraining the derivatives of the relationship of apparent conductivity with respect to frequency can be observed by referring to FIGS. 2a, 2b and 2c. FIG. 2a shows a graph of apparent conductivities at each of the eight previously described component frequencies for the receiver signal in a 100 mS/m conductivity medium surrounding the instrument. The signals used to generate the apparent conductivities in FIG. 2a are substantially free of noise. The best fit curve is shown at 100. The best fit curve 100 can be a fourth order polynomial, but it is to be understood that fourth order polynomial expressions are not the only types of best fit curve which will perform the method of the present invention. Using the relationship according to equation (6), a skin effect corrected value of conductivity of 100 mS/m is calculated, which exactly matches the conductivity of the medium used to generate the receiver signals.

In FIG. 2b, the same apparent conductivity signals (for a 100 mS/m conductivity medium) are used, but 10 mS/m RMS random noise has been added into the signals. The resulting apparent conductivity values at the various component frequencies can be observed along curve 101. By constraining the first derivative to be generally less than zero and the second derivative to be generally more than zero, a best fit curve, shown at 102 can be calculated according to equation (16). Using the relationship of equation (6), a skin effect corrected conductivity value of 97.5 mS/m is calculated for the conductivity of the medium.

FIG. 2c shows a best fit curve calculated for the same noisy data as in FIG. 2b, shown at 101, but without the constraints on the first and second derivatives. The unconstrained best fit curve is shown at 104. Using the expression in equation (6) in the best fit curve 104 if FIG. 2c calculates a skin effect corrected conductivity value of 73.9 mS/m. The skin effect corrected conductivity calculated without constraining the derivatives can be subject to significant error when the signals include noise.

In the present invention, it is possible to quantify the magnitude of misfit of apparent conductivity measurements at any particular component frequency with respect to the polynomial expression determined according to equation (16). The magnitude of the misfit, and the frequencies at which the misfit occurs, can be used to determine whether the well logging instrument is subject to certain types of error in its measurements. For example, misfit at one or two frequencies which occurs over a substantial portion of the interval of the wellbore can indicate a resonant condition in one or more of the receiver coils (shown as 18A–18F in FIG. 1).

Although the amount of noise at any one of the component frequencies can be adjusted during the process of generating the weighting matrix according to equation (15), it is also contemplated that the noise variance calculated for each component frequency can be compared to a predetermined noise threshold. If the noise variance of a particular component frequency exceeds the predetermined threshold, the value of apparent conductivity at that frequency can be excluded from determining the relationship of apparent conductivity with respect to frequency. A threshold which can be useful would be represented by a noise variance in excess of 20 percent of the skin effect corrected value of conductivity. The best fit curve can be recalculated after exclusion of the component frequency having noise in excess of the threshold variance value.

It has been observed that the first derivative of the best fit curve typically has a decreasing negative value with respect to frequency for most values of conductivity encountered in earth formations. This observation provides another manner of data quality verification which can be performed during generation of the best fit curve. When the first derivative fails to maintain a value generally less than zero over the entire range of frequencies, a calibration error, typically inclusion of a bias error, may be indicated for the particular receiver coil (18A–18F in FIG. 1) whose signals are so affected.

It is also possible, using the method of the present invention, to simulate the response of an induction well logging instrument operating at other frequencies within the range of frequencies included in the signals received by the instrument (10 in FIG. 1). For example, the apparent conductivity response at a frequency of 20 KHz can be calculated from the ordinate value of the best fit curve (such as 102 in FIG. 2b) corresponding to a frequency of 20 KHz. Simulating the instrument response at other frequencies can enable the system operator to generate well logs having response which substantially matches that of earlier generation induction well logging instruments. Such a capability can be useful to geologists attempting to correlate well log response of the current wellbore to earlier generation well logs run in other wellbores.

Those skilled in the art will readily be able to devise different embodiments of the invention which will not depart from the spirit of the invention disclosed herein. Accordingly, the scope of the invention should be limited only by the attached claims.

What is claimed is:

1. A method of correcting receiver signals in an induction well logging instrument for skin effect, comprising:

determining a magnitude of said signals induced in said receiver at each one of a plurality of different frequencies;

determining a best fit curve of said magnitude of said signals with respect to frequency; and calculating a skin effect corrected conductivity by determining a value of said best fit curve which would obtain when said frequency is equal to zero.

2. The method as defined in claim 1 further comprising:

calculating a relationship of a first derivative of said best fit curve with respect to said frequency; and calculating a correction for said signals at a selected frequency from said relationship of said first derivative.

3. The method as defined in claim 2 further comprising calculating a relationship of a second derivative of said best fit curve with respect to said frequency and calculating a correction for said signals at said selected frequency from said relationship of said first derivative and said relationship of said second derivative.

4. The method as defined in claim 1 wherein said step of calculating said best fit curve comprises constraints, said constraints including that a first derivative of said best fit curve is generally less than zero, said constraints including that a second derivative of said best fit curve with respect to said frequency is generally greater than zero.

5. The method as defined in claim 1 further comprising generating a weighting factor for each one of said magnitudes of said signals, each one of said weighting factors corresponding to a noise variance of the corresponding magnitude with respect to said frequency.

6. The method as defined in claim 1 further comprising calculating a synthetic receiver response corresponding to a selected frequency not present in said plurality of frequencies, said step of calculating said synthetic response including determining a value of said best fit curve at said selected frequency.

7. A method of logging earth formations penetrated by a wellbore using an induction well logging instrument, said instrument comprising a transmitter and a receiver, said method comprising:

inserting said instrument into said wellbore;

energizing said transmitter with alternating current at a plurality of different frequencies;

measuring signals induced in said receiver in response to eddy currents induced in said earth formations;

determining a magnitude of said signals induced in said receiver at said plurality of different frequencies;

determining a best fit curve of said magnitudes with respect to frequency; and calculating a skin effect corrected value of conductivity of said earth formations by determining a value of said best fit curve which would obtain when said frequency is equal to zero.

8. The method as defined in claim 7 further comprising:
calculating a relationship of a first derivative of said best fit curve with respect to said frequency; and calculating a correction for said signals at a selected frequency from said relationship of said first derivative.

9. The method as defined in claim 8 further comprising calculating a relationship of a second derivative of said best fit curve with respect to frequency; and calculating a correction for said signals at said selected frequency from said relationship of said first derivative and said relationship of said second derivative.

10. The method as defined in claim 7 wherein said step of calculating said best fit curve comprises constraints, said constraints including that a first derivative of said best fit curve is generally less than zero, said constraints including that a second derivative of said best fit curve with respect to said frequency is generally greater than zero.

11. The method as defined in claim 7 further comprising generating a weighting factor for each one of said magnitudes, each one of said weighting factors corresponding to a noise variance of the corresponding magnitude with respect to said frequency.

12. The method as defined in claim 7 further comprising:
removing any one of said magnitudes which exceeds a predetermined noise threshold; and recalculating said best fit curve excluding said any one of said magnitudes which exceeds said noise threshold.

13. The method as defined in claim 7 further comprising moving said instrument along said wellbore and repeating said steps of energizing, measuring determining, calculating said best fit curve, calculating said relationship and calculating said correction, until a selected interval of said wellbore has been logged.

* * * * *